United States Patent
Hong et al.

(10) Patent No.: US 9,612,782 B2
(45) Date of Patent: Apr. 4, 2017

(54) SCHEDULED AND SECURED CLOUD PRINT SERVICES

(75) Inventors: Jiang Hong, San Jose, CA (US); Subha Prabhu, Cupertino, CA (US)

(73) Assignee: Ricoh Company, Ltd., Tokyo (JP)

( * ) Notice: Subject to any disclaimer, the term of this patent is extended or adjusted under 35 U.S.C. 154(b) by 520 days.

(21) Appl. No.: 13/327,543

(22) Filed: Dec. 15, 2011

(65) Prior Publication Data

US 2013/0155441 A1 Jun. 20, 2013

(51) Int. Cl.
*G06F 3/12* (2006.01)

(52) U.S. Cl.
CPC .......... *G06F 3/1222* (2013.01); *G06F 3/1238* (2013.01); *G06F 3/1267* (2013.01); *G06F 3/1287* (2013.01); *G06F 3/1288* (2013.01); *G06F 3/1228* (2013.01)

(58) Field of Classification Search
CPC .................................................. G06F 3/1238
USPC .................................................. 358/1.1–1.16
See application file for complete search history.

(56) References Cited

U.S. PATENT DOCUMENTS

| | | |
|---|---|---|
| 6,192,407 B1 | 2/2001 | Smith et al. |
| 6,307,640 B1 | 10/2001 | Motegi |
| 7,755,786 B2 | 7/2010 | Foehr |
| 8,169,627 B2 | 5/2012 | Kudo et al. |
| 8,780,381 B2 | 7/2014 | Truong |
| 2002/0083114 A1* | 6/2002 | Mazzagatte et al. ......... 709/100 |
| 2002/0101608 A1 | 8/2002 | Whitmarsh |
| 2003/0038965 A1 | 2/2003 | Simpson et al. |
| 2003/0067625 A1 | 4/2003 | Kim |
| 2004/0001217 A1* | 1/2004 | Wu ........................ G06F 3/1204 358/1.15 |
| 2005/0005047 A1* | 1/2005 | Keeney et al. ................ 710/100 |
| 2006/0227368 A1* | 10/2006 | Hong ............................ 358/1.15 |

(Continued)

FOREIGN PATENT DOCUMENTS

| | | |
|---|---|---|
| JP | 2006-106977 | 4/2006 |
| JP | 2008097239 A | 4/2008 |

OTHER PUBLICATIONS

Japan Foreign Office Action in application No. JP 2012-173676, dated Jun. 14, 2016, 2 pages.

(Continued)

*Primary Examiner* — Fan Zhang
(74) *Attorney, Agent, or Firm* — Hickman Palermo Becker Bingham LLP; Edward A. Becker (57) ABSTRACT

Techniques are provided for processing scheduled and secured print requests. In one embodiment, a printing device receives a notification form a network service that a request to print an electronic document has been received. The printing device determines whether the request indicates secure printing of the electronic document. In response to determining that the request indicates secure printing of the electronic document, the printing device prompts, through a user interface, a user for a release code. In response to receiving the release code, the printing device sends the release code to the network service. The printing device receives, from the network service, access data that allows for retrieval of the electronic document. The printing device downloads the electronic document based on the access data received from the network service and generates print data for the electronic document.

14 Claims, 5 Drawing Sheets

(56) References Cited

U.S. PATENT DOCUMENTS

| | | |
|---|---|---|
| 2007/0177920 A1* | 8/2007 | Katano et al. ............... 400/76 |
| 2007/0229926 A1 | 10/2007 | Morisaki et al. |
| 2007/0247664 A1* | 10/2007 | Yamamoto ........... G06F 3/1203 358/1.16 |
| 2008/0055627 A1* | 3/2008 | Ellis .................. G06F 21/608 358/1.14 |
| 2010/0182630 A1* | 7/2010 | Jethani et al. ............ 358/1.15 |
| 2010/0277756 A1* | 11/2010 | Merriam .................. 358/1.15 |
| 2011/0188063 A1* | 8/2011 | Nuggehalli et al. ....... 358/1.13 |
| 2011/0299110 A1* | 12/2011 | Jazayeri et al. ........... 358/1.15 |
| 2012/0268778 A1* | 10/2012 | Nakawaki ............. G06F 3/122 358/1.15 |
| 2013/0038898 A1 | 2/2013 | Nuggehalli |
| 2013/0070278 A1* | 3/2013 | Cochran et al. ........... 358/1.14 |

OTHER PUBLICATIONS

U.S. Appl. No. 13/205,348, filed Aug. 8, 2011, Notice of Allowance, Jun. 15, 2016.

\* cited by examiner

SCHEDULED AND SECURED CLOUD PRINT SERVICES

FIELD OF THE INVENTION

The present disclosure relates generally to network printing services and, more specifically, to network print services for scheduling and securing print data.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

As networking infrastructure becomes more widespread and increases in bandwidth, cloud computing has become increasingly popular. Cloud computing typically involves a corporation or other entity providing software, storage, and/or other computing resources to an end user over a network. Thus, the burden of maintaining, expanding, and updating computing resources is shifted away from the end user and to the cloud service provider. This, in turn, allows computing resources, such as software, to be offered to the end user as a service instead of as a product.

Cloud print services enable end users to print from any location to any network-connected printer. In a typical scenario, the network-connected printer is registered with the cloud print service for one or more user accounts. Once registered, the end user can then print to the network-connected printer from any location using any appropriate network device as long as they are logged on to their user account. Upon receiving print requests from the end user, the cloud print service immediately notifies the network-connected printer, and the network-connected printer starts printing.

Since cloud print services push print jobs immediately after submission, the delay between an end user submitting a job and the printer generating the printout is typically short. If the user is not physically present near the printer when the printout is ready, others may gain unauthorized access to the printout.

SUMMARY

Techniques are described for providing and interfacing with scheduling and security network print services. In an embodiment, a printing device comprises a user interface and a print agent. The print agent is configured to receive a notification from a network service that a request to print an electronic document has been received. The print agent determines whether the request indicates secure printing of the electronic document. In response to determining that the request indicates secure printing of the electronic document, the print agent prompts, through the user interface, a user for a release code. In response to receiving the release code, the print agent sends the release code to the network service. The print agent receives, from the network service, access data that allows for retrieval of the electronic document. Receipt of the access data indicates that the release code was successfully verified by the network service. The print agent downloads the electronic document based on the access data received from the network service and generates print data for the electronic document.

In another embodiment, the print agent is further configured to receive, from the network service, print option data that identifies one or more print options to apply when printing the electronic document. Generating the print data for the electronic document is based on the one or more print options. In another embodiment, the print agent is further configured to receive error data from the network service. The error data indicates that the network service did not successfully verify the release code. In response to receiving the error data, the print agent causes the user interface to display an error message to indicate to the user that the release code could not be verified. In another embodiment, the print agent is further configured to, without prompting for a release code, request access data from the network service, receive the access data from the network service, download the electronic document based on the access data received from the network service, and generate print data for the electronic document in response to determining that the request does not indicate secure printing of the electronic document. In an embodiment, the printing device receives the notification from the network service at a time specified by scheduling data that indicates a time delay for printing the electronic document as specified by a client device.

In an embodiment, the access data includes a Uniform Resource Locator (URL) that identifies where the electronic document is available for download, and the print agent uses the URL to download the electronic document. In another embodiment, the notification includes identification data that the network service uses to identify the request and lock data to indicate that the electronic document is secure. The print agent determines whether the request indicates secure printing of the electronic document based on the lock data.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

I. Overview
II. System Architecture
III. Processing Print Requests for Scheduled and Secured Printing
IV. Interfacing with Web Scheduling and Security Services V. Example Communication Exchange
VI. Implementation Mechanisms

I. Overview

Techniques are described for providing and interfacing with scheduling and security network print services. In an embodiment, a printing device comprises a user interface and a print agent. The print agent is configured to receive a notification from a network service that a request to print an electronic document has been received. The print agent determines whether the request indicates secure printing of the electronic document. In response to determining that the request indicates secure printing of the electronic document, the print agent prompts, through the user interface, a user for a release code. In response to receiving the release code, the print agent sends the release code to the network service. The print agent receives, from the network service, access data that allows for retrieval of the electronic document. Receipt of the access data indicates that the release code was successfully verified by the network service. The print agent downloads the electronic document based on the access data received from the network service and generates print data for the electronic document.

In another embodiment, the print agent is further configured to receive, from the network service, print option data that identifies one or more print options to apply when printing the electronic document. Generating the print data for the electronic document is based on the one or more print options. In another embodiment, the print agent is further configured to receive error data from the network service. The error data indicates that the network service did not successfully verify the release code. In response to receiving the error data, the print agent causes the user interface to display an error message to indicate to the user that the release code could not be verified. In another embodiment, the print agent is further configured to, without prompting for a release code, request access data from the network service, receive the access data from the network service, download the electronic document based on the access data received from the network service, and generate print data for the electronic document in response to determining that the request does not indicate secure printing of the electronic document. In an embodiment, the printing device receives the notification from the network service at a time specified by scheduling data that indicates a time delay for printing the electronic document as specified by a client device.

In another embodiment, the access data includes a Uniform Resource Locator (URL) that identifies where the electronic document is available for download, and the print agent uses the URL to download the electronic document. In another embodiment, the notification includes identification data that the network service uses to identify the request and lock data to indicate that the electronic document is secure. The print agent determines whether the request indicates secure printing of the electronic document based on the lock data.

II. System Architecture

Figure 1:
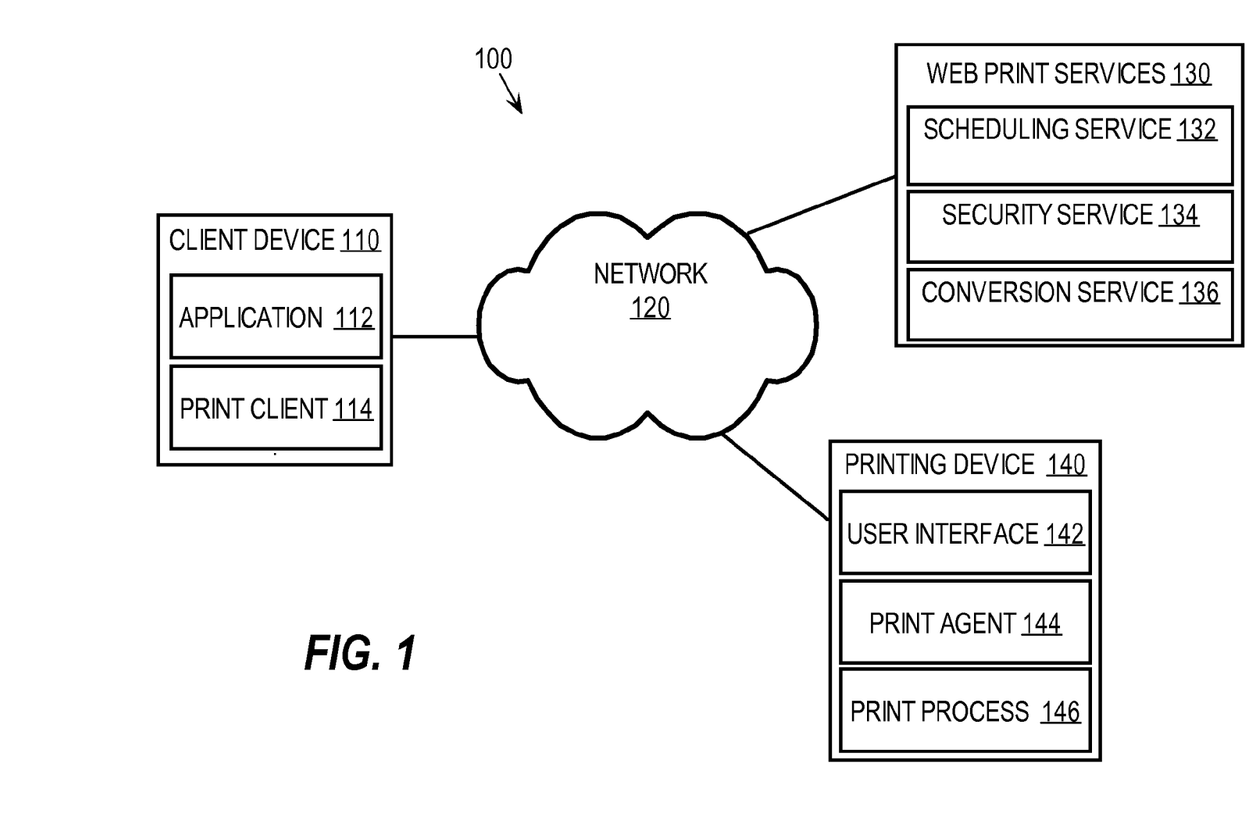
FIG. 1 is a block diagram that depicts an example system architecture with scheduling and security network print services, according to an embodiment.

FIG. 1 is a block diagram that depicts an example system architecture with scheduling and security network print services, according to an embodiment. Example network arrangement 100 includes client device 110, web print services 130, and printing device 140, communicatively coupled via network 120.

Client device 110 may be implemented by any type of client device. Example implementations of client device 110 include, without limitation, workstations, personal computers, laptop computers, tablet computers, personal digital assistants (PDAs), cellular telephony devices, or any type of mobile devices. In example network arrangement 100, client device 110 is configured with an application 112 and a print client 114. Client device 110 may be configured with other mechanisms, processes, and functionality, depending upon the particular implementation.

Application 112 may be any type of application process. Examples of application 112 include, without limitation, a word processor, a spreadsheet program, an email client, a web browser, etc. Application 112 and print client 114 operate together to provide a platform through which a user can schedule or secure a printing at printing device 140. In one embodiment, application 112 is configured to display an electronic document and print client 114 is configured to provide a graphical user interface (GUI) for printing the electronic document. Through such a GUI, a user may request a scheduled or secured printing of an electronic document at a particular printing device, such as printing device 140, and may specify the print options for a print job. Print client 114 may be an integrated component of application 112 (i.e., part of the same application process) or may be a separate application process, such as a plug-in, extension, or driver.

Print client 114 is configured to interface with web print services 130. In one embodiment, print client 114 does not include rendering capabilities to convert non-rasterized print data to rasterized print data. For example, print client 114 may be analogous to a print driver without a capability to generate rasterized print data. Accordingly, print client 114 may be configured as a shell driver that enables the user to select printing device 140 for printing without having to install a print driver particular to printing device 140. In another example, print client 114 may be implemented as an application process rather than a driver. Accordingly, print client 114 may be a plug-in, extension or other application module of application 112 that interfaces with web print services 130 to detect and display available printers and print options to a user.

Web print services 130 may be implemented by one or more computing devices that are capable of communicating with client device 110 and printing device 140 over network 120. Although web print services 130 are illustrated as a single block, web print services 130 may be distributed across multiple devices that are communicatively coupled via network 120 and may be implemented on client device 110 or printing device 140. Web print services 130 are configured to process print requests received from client device 110 and to cause printing device 140 to print an electronic document based on the print request. In example network arrangement 100, web print services 130 include scheduling service 132, security service 134, and conversion service 136. Scheduling service 132 is configured to schedule a print job based on schedule data and security service 134 is configured to provide security for a requested print job according the approaches described in further detail below. Conversion service 136 converts electronic document data from one format to another. For example, conversion service 136 may convert an electronic document identified in a print request to a portable document format (PDF). In another example, conversion service 136 may convert electronic document data to page description language (PDL) data, printer command language (PCL) data, other non-rasterized print data or rasterized print data. In alternative embodiments, one or more of these services may be omitted or implemented by client device 110 or printing device 140.

Web print services 130 may also include other services, not depicted for purposes of brevity. For example, web print services 130 may include a printing device registration service. The printing device registration service registers a printing device, such as printing device 140, with one or more users. Web print services 130 may require client device 110 to authenticate before allowing access to printing device 140. For instance, a user of client device 110 may be required to provide a username and password to view and access printing device 140 via web print services 130. Web print services 130 may further include storage resources for storing print option data, release code data, access data, and/or other data for processing scheduled and secure print requests submitted by client device 110. The storage resources may be implemented as any type of volatile or non-volatile storage.

Although only one client device and one printing device are illustrated for purposes of brevity, web print services 130 may be communicatively coupled to a plurality of client devices and/or a plurality of printing devices. Thus, web print services 130 may process multiple print requests from different client devices requesting to print to various printing devices. Web print services 130 may implement serial and/or parallel processing techniques to process the different print requests. Web print services 130 may assign unique job identifiers to each print request to help distinguish between the requests and locate data associated with each print request, as described in further detail below.

Printing device 140 may be implemented by any type of device that is capable of processing print data and generating printed versions of electronic documents reflected in the print data. In example network arrangement 100, printing device 140 includes user-interface 142, print agent 144, and print process 146. Printing device 140 may be configured with other mechanisms, processes and functionality, depending upon the particular implementation. The approaches described herein for processing scheduled and secured print requests are not limited to any particular type of printing device or network configuration. For example, printing device 140 may be a multi-function peripheral (MFP) that includes any combination of printing, copying, facsimile and scanning capability, etc. Any number of devices, including printing devices, client devices, and other devices, may be included in the network.

User interface 142 may be implemented by any suitable user interface for interacting with a user of printing device 140. Examples of user interface 142 include, without limitation, alphanumeric keys, buttons, touchscreen displays, liquid crystal displays (LCDs), light emitting diode (LED) displays, and any other mechanisms for receiving input and displaying output to a user. Print agent 144 may be implemented by one or more processes configured to discover and interact with web print services 130, such as scheduling service 132, security service 134, and conversion service 136, as described in more detail hereinafter. Print agent 144 may also be configured to generate print data and/or fetch print data for the electronic document. Print process 146 may be implemented by one or more processes for processing print data received from web print services 130 or generated by print agent 144, and for generating a printed version of an electronic document reflected in the print data.

Print agent 144 and print process 146 may be implemented as resident processes on printing device 140. Alternatively, one or more of these services may be made available to printing device 140 on a removable media or may be implemented at a remote location with respect to printing device 140. Also, print agent 144 and print process 146 may be implemented in hardware, software, or any combination of hardware or software, depending upon the particular implementation.

Network 120 may be implemented with any type of medium and/or mechanism that facilitates the exchange of information between client device 110, web print services 130, and printing device 140. Furthermore, network 120 may use any type of communications protocol and may be secured or unsecured, depending upon the particular implementation.

III. Processing Print Requests for Scheduled and Secured Printing

According to embodiments described herein, users of client device 110 may schedule and/or secure print jobs using web print services 130. No print drivers need to be installed on client device 110 in order to take advantage of these services. For example, client device 110 may submit print requests for a scheduled or secured printing of an electronic document to web print services 130. The print requests may be in any format, and the format may be independent of the type, manufacturer, or other characteristic of printing device 140.

Figure 2:
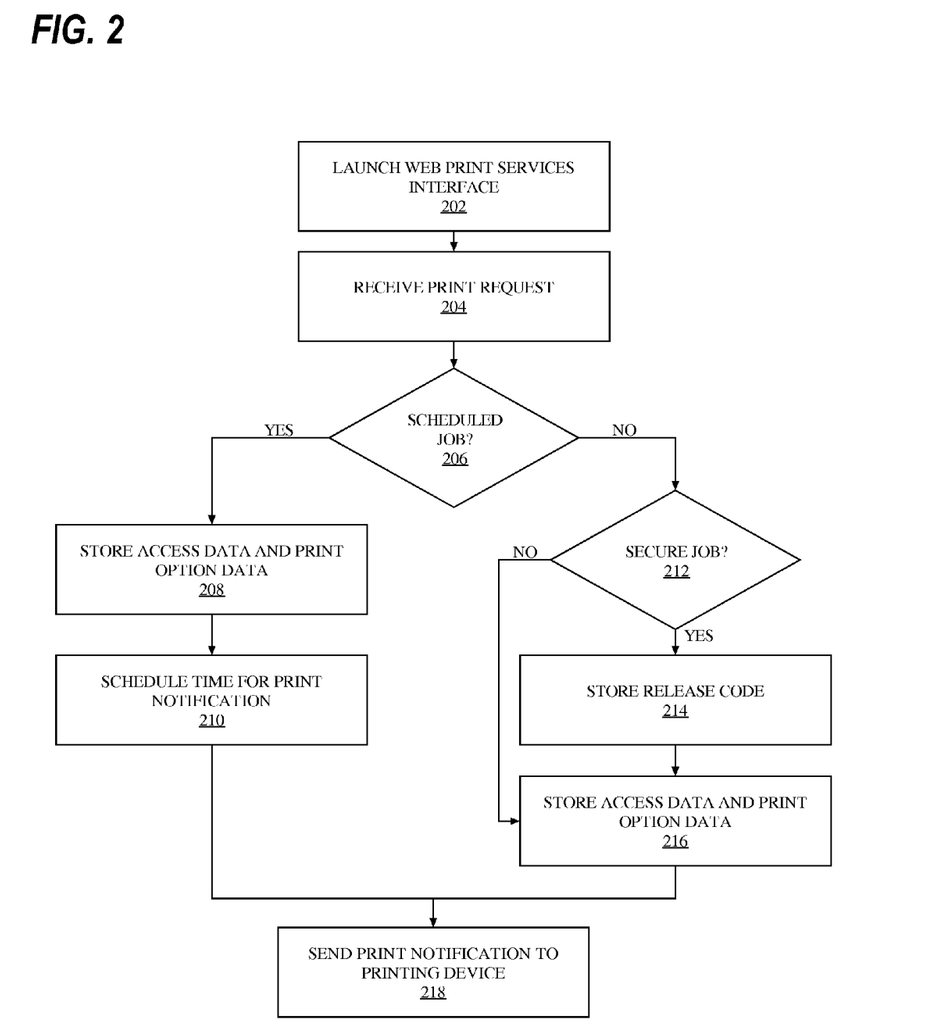
FIG. 2 is a flow diagram depicting an approach for processing print requests for scheduled or secured printings, according to an embodiment.

FIG. 2 is a flowchart depicting an example approach for processing print requests for scheduled and secured print jobs, in accordance with an embodiment. In step 202, web print services 130 launches an interface for receiving print requests from client device 110. In an example embodiment, the interface communicates with print client 114 and sends print client 114 information regarding which printing devices and print options are available to a user. Print client 114 displays this information to the user through a GUI. The GUI of print client 114 may also display elements that allow the user to schedule and/or secure a print job. For example, the user may enter a time to print an electronic document or enter a release code to lock printing of the electronic document through the GUI. Print client 114 generates a print request based on the user input received through the GUI and sends the print request to web print services 130.

In step 204, web print services 130 receives a print request from client device 110. The format of the print request may vary from implementation to implementation. In one embodiment, the print request includes electronic document identification data that identifies an electronic document to print. The electronic document identification data may include the electronic document itself or a reference, such as a URL, that identifies the location of the electronic document. As used herein, a URL may comprise any form of Universal Resource Identifier (URI). The electronic document may comprise any electronic media content that may be printed by a printing device. Examples include, without limitation, text-based files such as word processing documents and spreadsheet files, or image-based files, such as files including pixel data and vector data.

In another embodiment, the print request includes schedule data that identifies a time for printing the electronic document identified by the electronic document identification data. Schedule data may identify the time in any suitable format. For example, schedule data may specify a period of delay to wait until printing the document or may specify a particular date and time for printing. Thus, schedule data may indicate an absolute or relative time.

In another embodiment, the print request includes release code data for securing the printing of the electronic document. The format of the release code may vary depending on the implementation. For example, a release code can be represented by a unique alphanumeric string, containing letters, digits and special characters. The string can have a fixed or variable length. The release code may be specified by a user through the user interface or print client 114. Alternatively, the release code may be based on a preconfigured or randomly generated value.

In another embodiment, the print request includes print option data. Print option data may generally comprise data that identifies printing preferences, print settings, or other print attributes. Example print options include, without limitation, print quality, duplex settings, number of copies, print range, and any other option for configuring how a document is printed.

In an embodiment, step 204 involves conversion service 136 converting the electronic document identified by the electronic document identification data from one format to another. Conversion service 136 may convert the electronic document from its original format to a standard format that is compatible with processing by printing device 140. Thus, the burden of supporting numerous file formats may be shifted away from printing device 140 to web print services 130. Once converted, conversion service 136 stores the electronic document in the standard format and generates access data identifying how to access the electronic document in the standard format. In other embodiments, conversion service 136 may generate any form of print data for the electronic document. Print data may comprise any data representative of an electronic document that is used for printing the electronic document. Print data may include data for an entire print job or data for any other portion of a print job. Non-rasterized print data comprises any portion of print data that has not been rasterized. Examples of non-rasterized print data include, without limitation, data representative of the electronic document in a vector graphics format or any other non-rasterized format that may be processed by printing device 140 to generate a printout of the electronic document. Rasterized print data comprises any portion of print data that has been rasterized. Examples of rasterized print data include, without limitation, raster image data representative of the electronic document in the form of pixels or dots that may be processed by printing device 140 to generate a printout of the electronic document.

In step 206, web print services 130 determines whether the print request is for a scheduled print job. For instance, the print request may be processed to determine whether it includes any schedule data. If the request includes schedule data, then the process continues to step 208. If not, then the process continues to step 212.

In step 208, web print services 130 stores access data and print option data. Access data comprises any data that identifies where to access the electronic document data, print option data, or other print data for the electronic document. For example, the access data may include, without limitation, a URL identifying the location of the electronic document. In an embodiment, the access data identifies the electronic document in its converted format as generated by conversion service 136. In an alternative embodiment, access data identifies the location of an electronic document that has not been converted by conversion service 136.

In an embodiment, step 208 includes assigning a job identifier to the print request. The job identifier may include any data that may be used by web print services 130 to identify a particular print request. For example, the job identifier can be represented by a unique alphanumeric string, containing letters, digits and special characters. The string can have a fixed or variable length. In an embodiment, job identifier is generated by web print services 130 in response to receiving a print request. The job identifier may be generated based on preconfigured or randomly generated values, or by any other suitable mechanism for generating a unique identifier for distinguishing the print request. When assigned to the print request, the job identifier is associated with other data related to the request, which may include, without limitation, any access data, release code data, and/or print option associated with the print request. This data may be stored in one or more databases managed by web print services 130.

In step 210, scheduling service 132 schedules a time for printing the electronic document based on the schedule data. Step 210 may include scheduling service 132 parsing the schedule data included in a print request to determine when a print notification should be issued to printing device 140. Scheduling service 132 may implement any suitable scheduling system for causing web print services 130 to issue a print notification to printing device 140 at a scheduled time. For example, scheduling service 132 may implement clock interrupts, IO interrupts, operating system calls, polling, or any other form of signal to cause web print services 130 to issue the print notification at the appropriate time.

If, in step 206, web print services 130 determines that the print request is not for a scheduled print job, then in step 212, web print services 130 determines whether the print request is for a secured printing. For instance, the print request may be processed to determine whether it includes release code data. If the request is for a secured printing, then the process continues with step 214. If not, then the process continues with step 216.

In step 214, web print services 130 stores the release code data. Step 214 may comprise assigning or otherwise associating a job identifier with the release code data. Web print services 130 uses the job identifier to locate the release code associated with a particular print request. The release code data is used by security service 134 to authenticate a user, as described in further detail below.

In step 216, web print services 130 stores the access data and the print option data. Step 216 may comprise assigning or otherwise associating a job identifier to the access data and print option data, as described above for step 208. Because this information is stored and maintained by web print services 130, the burden of providing resources for processing such print requests is shifted away from printing device 140. For instance, in an embodiment, web print services 130 stores the electronic document, the release code, and/or the print option data until the scheduled print time or verification of a release code. As there may be significant delay between the print request and printing of the document, maintaining and storing this data by web print services 130 ameliorates potential backlog at printing device 140. In addition, web print services 130 extends the functionality of the printing device 140 without requiring installation of a special print driver by providing scheduling and security services.

In step 218, web print services 130 sends a print notification to the printing device 140. The print notification causes the printing device to print an electronic document according to approaches described in further detail below.

The steps illustrated in FIG. 2 are meant for purposes of illustration and should not be limited to any particular order. For example, step 216 may be performed before or after step 214. In alternative embodiments, the processing of scheduled print requests may be independent of the processing of secured print requests. For instance, a service may only support secured print requests and thus omit steps 206 to 210 of the flowchart illustrated in FIG. 2. Similarly, a service may only support scheduled print requests and omit steps 212 to 216.

IV. Interfacing with Web Scheduling and Security Services

Figure 3:
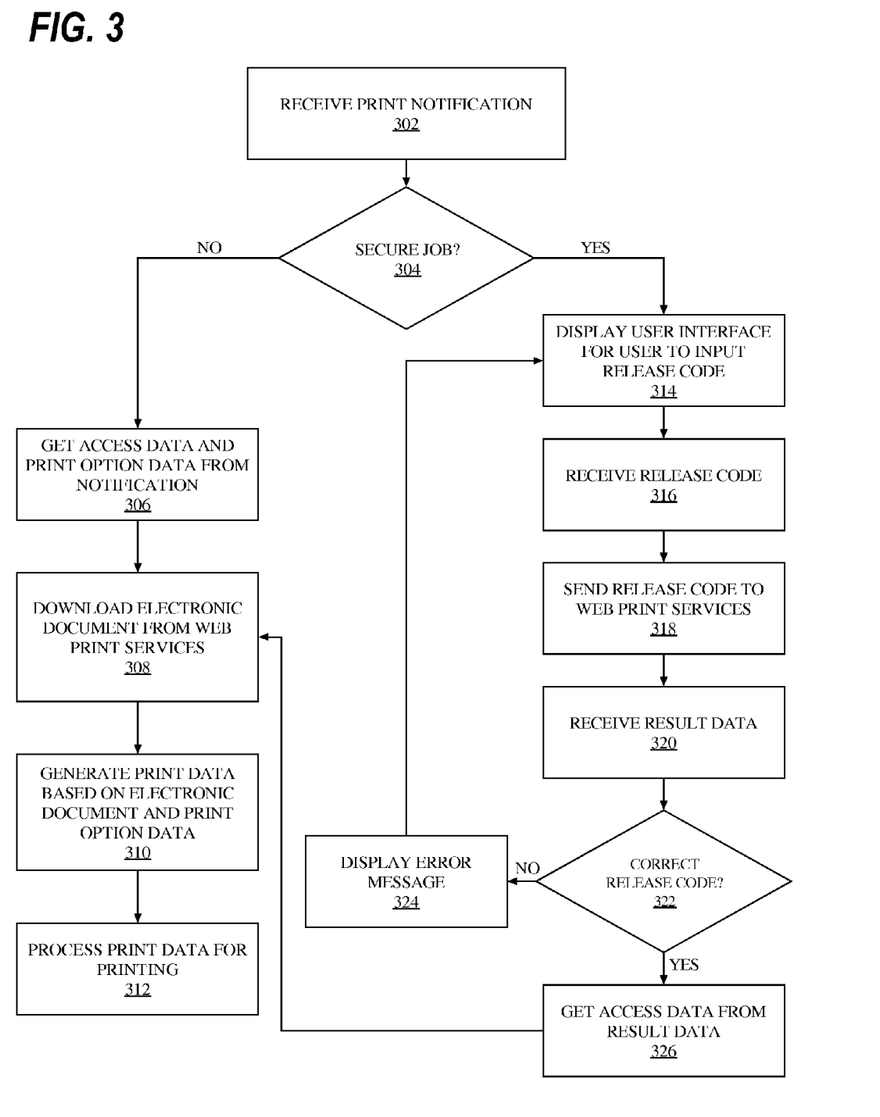
FIG. 3 is a flow diagram depicting an approach for interfacing with web print services to generate a printout that has been scheduled or secured, according to an embodiment.

According to embodiments described herein, printing devices may interface with network print services such that the network print services provide scheduling and security services for the printing device. FIG. 3 is a flow diagram depicting an approach for interfacing with web print services to generate a printout that has been scheduled or secured, according to an embodiment. In step 302, print agent 144 receives a print notification from web print services 130. The format of the print notification may vary depending on the implementation. In one embodiment, the print notification includes a job identifier. The job identifier is used by web print services 130 to identify electronic document data, access data, release code data, and/or print option data associated with a particular print request. The print notification may also include lock data if the print request was for a secure printing. Lock data may comprise any data that indicates to the printing device that the printout should be locked. In an example embodiment, the lock data only indicates that the printing is locked, but does not reveal the release code received at step 214 to printing device 140. Because, printing device 140 does not have access to the release code, printing device 140 relies on web print services 130 to authenticate the user. In an alternative embodiment, the lock data includes the release code, and authentication of the user may be performed by printing device 140. Approaches for authenticating a user based on the release code data are described hereinafter.

In step 304, print agent 144 determines whether the print notification indicates a secure printing. For example, print agent 144 may parse the print notification to determine whether there is lock data indicating that printing should be locked. If the print notification indicates that a secure printing has not been requested, then the process continues with step 306.

In step 306, print agent 144 retrieves access data and print option data from the notification. In an alternative embodiment, the notification does not include this data, and print agent 144 sends a fetch request to web print services 130 to retrieve this data. The fetch request includes the job identifier, which web print services 130 uses to locate the access data and print option data associated with the request. Web print services 130 fetches the data and returns the data to print agent 144 over network 120. In either scenario, the process continues with step 308, which is described in further detail below.

If the print notification indicates that a secure printing has been requested, then the process continues with step 314. In step 314, the print agent 144 causes user interface 142 to display a prompt for a user to input the release code. For example, a prompt requesting a user to input a release code to unlock a print job may be displayed on a display panel of printing device 140. In an embodiment, the prompt may be immediately displayed in response to determining that a print request is for a secure printing. In an alternative embodiment, printing device 140 may display the prompt when a user selects, via user interface 142, the locked printing associated with the release code.

In step 316, print agent 144 receives the release code via user interface 142. For instance, the user may enter the release code through a touchscreen panel, alphanumeric keys, buttons, or other input devices.

In step 318, print agent 144 sends the release code to web print services 130. In an embodiment, the job identifier received with the print notification at step 302 is sent with the release code. Upon receipt of this data, web print services 130 locates the release code stored at step 214 using the job identifier. Security service 134 verifies a release code by comparing the release code stored at step 214 with the release code sent at step 318. If the release codes match, then the release code is successfully verified and web print services 130 permits access to the electronic document for printing. If the release codes do not match, then web print services 130 prevents print agent 144 from accessing the electronic document.

In step 320, print agent 144 receives result data 320 from web print services 130. In an embodiment, result data is generated by web print services 130 in response to the release code verification described above. Result data includes data that indicates whether security service 134 successfully verified the release code. The format of the result data may vary, depending on the implementation. For example, the result data may or may not include access data depending on whether security service 134 successfully verified the release code.

In step 322, print agent 144 determines from the result data whether the release code was successfully verified. For example, print agent 144 may parse the result data to determine whether the result data includes access data for an electronic document. If the result data includes access data for the electronic document, then security service 134 successfully verified the release code, according to an embodiment. Conversely, if the result data does not include access data, then security service 134 did not successfully verify the release code. In another embodiment, the result data may comprise error data to indicate that the release code was not successfully verified.

If the result data indicates that the release code was not successfully verified, then print agent 144 causes user interface 142 to display an error message. The error message may comprise any type of message in any format to indicate to a user of printing device 140 that the release code could not be verified. After the error message is displayed, the process may return to step 314, and the user may be re-prompted to enter the release code. In an embodiment, security service 134 may track how many times an incorrect release code has been entered. If a threshold has been satisfied, then security service 134 may cancel the printing. Alternatively, the process may repeat until the correct release code is entered, a user cancels the print job or a threshold time has elapsed.

If the release code is successfully verified, then print agent 144 extracts the access data from the result data at step 326. The access data identifies how to access the electronic document. In an embodiment, the access data comprises a URL that identifies the location of the electronic document. In another embodiment, the access data may comprise security data for accessing the electronic document, such as encryption keys, certificates, or other data for maintaining security of the electronic document.

In an embodiment, the release code data includes the print option data received with the print request. Accordingly, print agent 144 may extract the print option data from the result data at step 326. In an alternative embodiment, the access data may also identify the location of the print option data. Print agent 144 uses the access data to download the print option data, as described below for step 308.

In step 308, print agent 144 uses the access data to download the electronic document data from web print services 130. For example, print agent 144 may extract a URL from the result data and download the document from the location specified by the URL. Any suitable communications protocol may be implemented to perform the download. Examples include, without limitation, the HyperText Transfer Protocol (HTTP), HTTP Secure (HTTPS), the File Transfer Protocol (FTP), Secure FTP (SFTP), Secure Socket Layer (SSL), and Transport Layer Security (TLS). In an embodiment, a secure session is established for downloading the electronic document based on a secure communications protocol. Access data may comprise any cryptographic keys, certificates, or other secure data for establishing a secure connection between print agent 144 and the site identified by the URL.

In step 310, print agent 144 generates print data from the downloaded document. In an embodiment, print agent 144 transforms electronic document data into PDL data or PCL data. In another embodiment, print agent 144 performs rasterization on the electronic document data, the PDL data, or the PCL data to generate a raster image of the electronic document. In yet another embodiment, print agent 144 generates print data based on the print option data. For example, print agent 144 may convert the print option data downloaded at step 308 or extracted at step 326 into a format that may be processed by print process 146.

In step 312, print process 146 processes the print data and generates a printout of the electronic document reflected in the print data. Print process 146 may implement any suitable mechanism for transforming the print data into a physical printout. In an embodiment, print process 146 comprises a raster image processor that rasterizes PDL data or PCL data generated by print agent 144. In alternative embodiment, non-rasterized printing may be implemented or the rasterization may be performed by print agent 144. Print process 146 further applies the print settings reflected in the print option data. For example, print process 146 may, without limitation, print multiple copies of the electronic document, print to a certain tray, or perform duplex printing based on the print settings reflected in the print option data.

Figure 4:
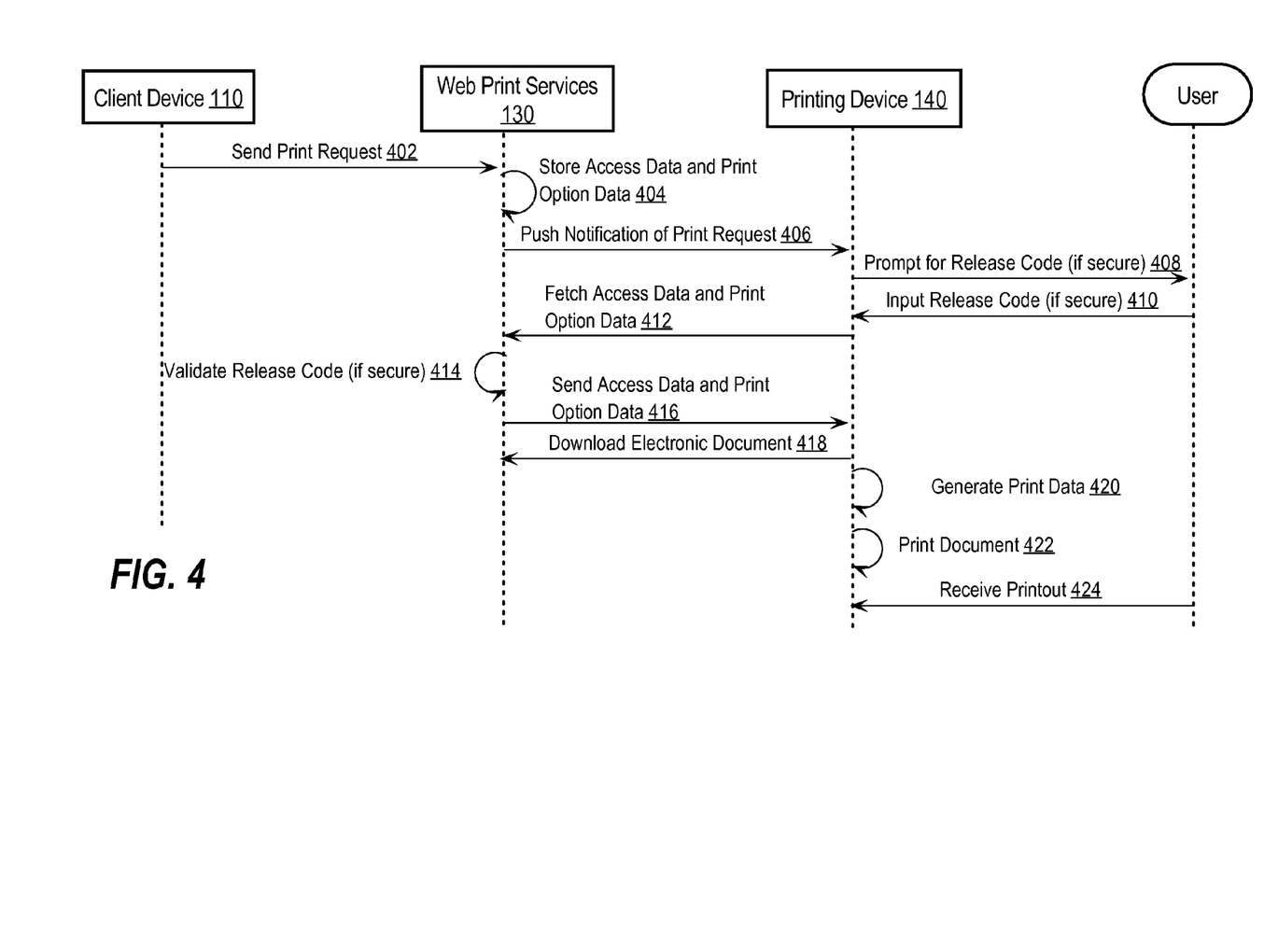
FIG. 4 is a flow diagram depicting communications exchanged between a client device, web print services, and a printing device, according to an embodiment.

The steps illustrated in FIG. 3 are meant for purposes of illustration and should not be limited to any particular order. In addition, one or more steps illustrated in FIG. 3 may be omitted, depending on the particular implementation. Therefore, the process of FIG. 3 is to be regarded in an illustrative rather than a restrictive sense V. Example Communication Exchange FIG. 4 is a flow diagram depicting communications exchanged between a client device, web print services, and a printing device, according to an embodiment. In step 202, client device 110 sends a print request to web print services 130. The print request may specify a scheduled or secured printing is desired by an end user. In step 204, web print services stores access data and print option data associated with the print request. In step 206, web print services 130 pushes a notification of the print request to printing device 140. In an embodiment, web print services 130 pushes the print notification at the scheduled time specified by the print request 202. If no scheduled time is specified, then web print services may immediately push the notification of the print request. In step 208, printing device 140 prompts for a release code if the push notification indicates that a secured printing was requested. If a secure printing was not requested, then printing device 140 may proceed with step 212. Otherwise, in step 210, the printing device 140 receives a release code from a user via user interface 142. In step 212, printing device 212 fetches the access data and print option data from web print services 130. In an embodiment, the fetch request includes the job identifier sent in step 206. In another embodiment, the fetch request includes the release code received at step 210. If a secured printing was not requested, then the fetch request at step 212 may be issued without including a release code. In step 214, web print services 130 verifies the release code. If the release code is successfully verified, then in step 216, web print services sends the access data and the print option data to printing device 140. In step 218, printing device downloads the electronic document based on the access data. In step 220, printing device generated print data representative of the electronic document. In step 222, printing device prints the electronic document based on the print data. In step 224, a user receives a printout of the electronic document.

The messages exchanged between client device 110, web print services 130, and printing device 140, as illustrated in FIG. 4 may be implemented using any suitable communication protocol. In an example embodiment, web print services 130 communicates with client devices 110 and/or printing device 140 using messages based on an Extensible Markup Language (XML). An example communications protocol based on XML includes, without limitation, the Extensible Messaging and Presence Protocol (XMPP), the Simple Object Access Protocol (SOAP), and other Web Services Description Languages (WSDLs).

VI. Implementation Mechanisms

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
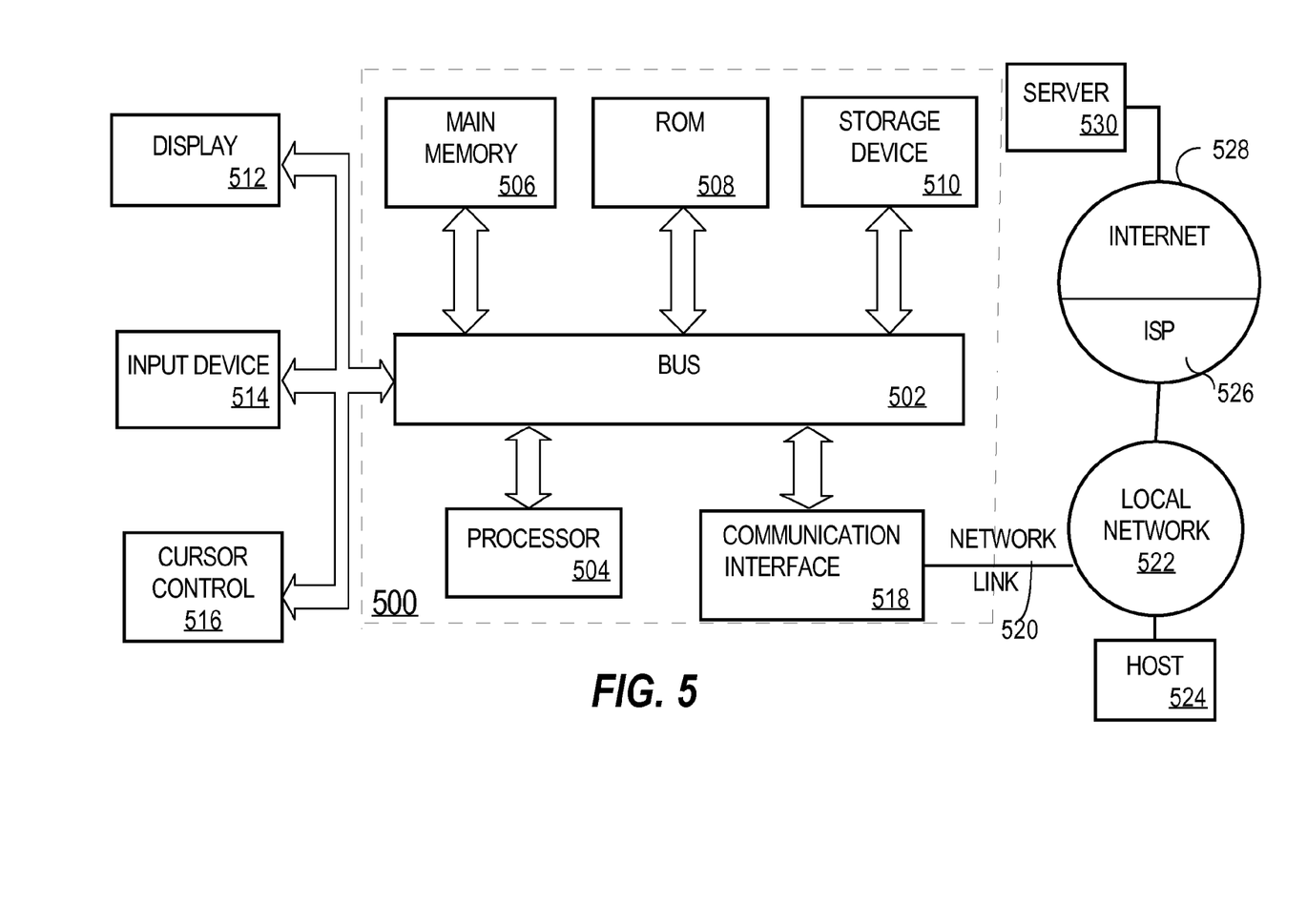
FIG. 5 is a block diagram that illustrates a computer system upon which an embodiment may be implemented.

For example, FIG. 5 is a block diagram that illustrates a computer system 500 upon which an embodiment may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A printing device comprising:
a user interface; and
a print agent configured to cause:
receiving, from a network service, a notification that the network service received a request to print an electronic document from a client device that communicates with the network service over a network, wherein when secure printing is requested, the request includes a release code, and wherein when scheduled printing is requested, the request includes scheduling data that specifies a time for the printing device to receive the notification from the network service;
determining whether the notification indicates secure printing or scheduled printing of the electronic document, wherein the notification includes lock data to indicate, without providing the release code, secure printing of the electronic document;
in response to determining that the notification indicates scheduled printing of the electronic document:
requesting access data from the network service;

in response to requesting the access data from the network service,
receiving the access data from the network service;
identifying, by the print agent from the access data received by the network service, a Uniform Resource Locator (URL) that identifies a network location for retrieval of the electronic document and that was received from a network service without prompting for a release code;
wherein the access data including the URL is received by the print agent at a time scheduled by the network service;
downloading, by the print agent, the electronic document from a network location identified by the URL that allows for retrieval of the electronic document without prompting for a release code;
in response to determining that the notification includes lock data that indicates, without providing the release code, secure printing of the electronic document:
prompting, through the user interface, a user for the release code that the network service uses to authenticate the user;
in response to receiving the release code, sending the release code to the network service;
after sending the release code to the network service, receiving, by the print agent from the network service, access data including the URL that allows for retrieval of the electronic document;
wherein receipt of the URL indicates that the release code was successfully verified by the network service;
in response to receiving the access data including the URL, downloading, by the print agent, the electronic document from a network location identified by the URL received from the network service; and
printing of the electronic document.

2. The printing device of claim 1, wherein the print agent is further configured to cause:
receiving, from the network service, print option data that identifies one or more print options to apply when printing the electronic document;
wherein generating the print data for the electronic document is based on the one or more print options.

3. The printing device of claim 1, wherein the print agent is further configured to cause:
receiving error data from the network service;
wherein the error data indicates that the network service did not successfully verify the release code;
in response to receiving the error data, displaying an error message on the user interface to indicate to the user that the release code is incorrect.

4. The printing device of claim 1,
wherein the notification includes identification data that the network service uses to identify the request.

5. The printing device of claim 1,
wherein the scheduling data indicates a time delay for printing the electronic document that was specified by the client device.

6. One or more non-transitory storage media storing instructions, which, when processed by one or more processors, cause:
receiving, from a network service, a notification that the network service received a request to print an electronic document from a client device that communicates with the network service over a network, wherein when secure printing is requested, the request includes a release code, and wherein when scheduled printing is requested, the request includes scheduling data that specifies a time for the printing device to receive the notification from the network service;
determining whether the notification indicates secure printing or scheduled printing of the electronic document, wherein the notification includes lock data to indicate, without providing the release code, secure printing of the electronic document;
in response to determining that the notification indicates scheduled printing of the electronic document:
requesting access data from the network service;
in response to requesting the access data from the network service, receiving the access data from the network service;
identifying, by the print agent from the access data received by the network service, a Uniform Resource Locator (URL) that identifies a network location for retrieval of the electronic document and that was received from a network service without prompting for a release code;
wherein the access data including the URL is received by the print agent at a time scheduled by the network service;
downloading, by the print agent, the electronic document from a network location identified by the URL that allows for retrieval of the electronic document without prompting for a release code;
in response to determining that the notification includes lock data that indicates, without providing the release code, secure printing of the electronic document:
prompting, through the user interface, a user for the release code that the network service uses to authenticate the user;
in response to receiving the release code, sending the release code to the network service;
after sending the release code to the network service, receiving, by the print agent from the network service, access data including the URL that allows for retrieval of the electronic document;
wherein receipt of the URL indicates that the release code was successfully verified by the network service;
in response to receiving the access data including the URL, downloading, by the print agent, the electronic document from a network location identified by the URL received from the network service; and
printing of the electronic document.

7. The one or more non-transitory storage media of claim 6, wherein the instructions further cause:
receiving, from the network service, print option data that identifies one or more print options to apply when printing the electronic document;
wherein generating the print data for the electronic document is based on the one or more print options.

8. The one or more non-transitory storage media of claim 6, wherein the instructions further cause:
receiving error data from the network service;
wherein the error data indicates that the network service did not successfully verify the release code;
in response to receiving the error data, displaying an error message on the user interface to indicate to the user that the release code is incorrect.

9. The one or more non-transitory storage media of claim 6, wherein the notification includes identification data that the network service uses to identify the request.

10. The one or more non-transitory storage media of claim 6, wherein the scheduling data indicates a time delay for printing the electronic document that was specified by the client device.

11. A method comprising:

receiving, from a network service, a notification that the network service received a request to print an electronic document from a client device that communicates with the network service over a network, wherein when secure printing is requested, the request includes a release code, and wherein when scheduled printing is requested, the request includes scheduling data that specifies a time for the printing device to receive the notification from the network service;

determining whether the notification indicates secure printing or scheduled printing of the electronic document, wherein the notification includes lock data to indicate, without providing the release code, secure printing of the electronic document;

in response to determining that the notification indicates scheduled printing of the electronic document:
  requesting access data from the network service;
  in response to requesting the access data from the network service, receiving the access data from the network service;
  identifying, by the print agent from the access data received by the network service, a Uniform Resource Locator (URL) that identifies a network location for retrieval of the electronic document and that was received from a network service without prompting for a release code;
  wherein the access data including the URL is received by the print agent at a time scheduled by the network service;
  downloading, by the print agent, the electronic document from a network location identified by the URL that allows for retrieval of the electronic document without prompting for a release code;

in response to determining that the notification includes lock data that indicates, without providing the release code, secure printing of the electronic document:
  prompting, through the user interface, a user for the release code that the network service uses to authenticate the user;
  in response to receiving the release code, sending the release code to the network service;
  after sending the release code to the network service, receiving, by the print agent from the network service, access data including the URL that allows for retrieval of the electronic document;
  wherein receipt of the URL indicates that the release code was successfully verified by the network service;
  in response to receiving the access data including the URL, downloading, by the print agent, the electronic document from a network location identified by the URL received from the network service; and printing of the electronic document.

12. The method of claim 11, further comprising:
receiving, from the network service, print option data that identifies one or more print options to apply when printing the electronic document;
wherein generating the print data for the electronic document is based on the one or more print options.

13. The method of claim 11, wherein the notification includes identification data that the network service uses to identify the request.

14. The method of claim 11, wherein the scheduling data indicates a time delay for printing the electronic document that was specified by the client device.

* * * * *